(12) United States Patent
Naor

(10) Patent No.: US 10,768,022 B2
(45) Date of Patent: Sep. 8, 2020

(54) OPTICAL ENCODER SYSTEM AND METHOD

(71) Applicant: Michael Naor, Rehovot (IL)

(72) Inventor: Michael Naor, Rehovot (IL)

(73) Assignee: Michael Naor, Rehovot (IL)

( * ) Notice: Subject to any disclaimer, the term of this patent is extended or adjusted under 35 U.S.C. 154(b) by 0 days.

(21) Appl. No.: 16/290,394

(22) Filed: Mar. 1, 2019

(65) Prior Publication Data

US 2019/0195662 A1    Jun. 27, 2019

Related U.S. Application Data

(63) Continuation of application No. PCT/US2017/068762, filed on Dec. 28, 2017.

(60) Provisional application No. 62/439,714, filed on Dec. 28, 2016.

(51) Int. Cl.
*G01D 5/34* (2006.01)
*G01D 5/347* (2006.01)
(Continued)

(52) U.S. Cl.
CPC ..... *G01D 5/34715* (2013.01); *G01D 5/34707* (2013.01); *G01D 5/34746* (2013.01); *G01D 5/34792* (2013.01); *G01D 5/38* (2013.01); *G01M 15/06* (2013.01); *G11B 7/0065* (2013.01); *G11B 7/00772* (2013.01); *G11B 7/083* (2013.01); *G11B 7/093* (2013.01); *G11B 7/131* (2013.01); *G11B 7/1353* (2013.01); *G11B 7/1374* (2013.01)

(58) Field of Classification Search
CPC .......... G01D 5/34715; G01D 5/34746; G01D 5/34707; G01D 5/34792; G01D 5/38; G11B 7/0065; G11B 7/00772; G11B 7/083; G11B 7/093; G11B 7/131; G11B 7/1353; G11B 7/1374; G01M 15/06
See application file for complete search history.

(56) References Cited

U.S. PATENT DOCUMENTS 4,922,351 A * 5/1990 Suzuki ............... G06K 7/14
                                                    358/475
5,107,107 A    4/1992 Osborne
(Continued)

FOREIGN PATENT DOCUMENTS

WO    2015145267 A2    10/2015

OTHER PUBLICATIONS

The International Search Report and the Written Opinion for PCT/US2017/068762, ISA/RU, Moscow, Russia, dated May 10, 2018.
(Continued)

*Primary Examiner* — Tony Ko
(74) *Attorney, Agent, or Firm* — M&B IP Analysts, LLC

(57) ABSTRACT

An improved optical encoder uses an optical pick-up unit that provides for degrees of freedom in the tracking and focus axes that are unavailable in conventional optical encoders thereby improving the encoders' performance. In an embodiment the encoder employs an optical disc marked with pits and lands which may be arranged in a spiral pattern. The optical disc is mounted on the shaft whose motion is to be monitored by the optical encoder. The encoder may be arranged to read the markings on the optical disc using the three-beam pickup method.

29 Claims, 11 Drawing Sheets

(51) Int. Cl.
*G01D 5/38* (2006.01)
*G01M 15/06* (2006.01)
*G11B 7/0065* (2006.01)
*G11B 7/007* (2006.01)
*G11B 7/08* (2006.01)
*G11B 7/09* (2006.01)
*G11B 7/131* (2012.01)
*G11B 7/1353* (2012.01)
*G11B 7/1374* (2012.01)

(56) References Cited

U.S. PATENT DOCUMENTS

| | | | |
|---|---|---|---|
| 5,825,023 A | 10/1998 | Cai et al. | |
| 6,975,576 B1* | 12/2005 | Uchiyama | G11B 7/0903 369/112.15 |
| 8,735,801 B2* | 5/2014 | Nagura | G01D 5/34784 250/231.13 |
| 2005/0128923 A1* | 6/2005 | Shin | G11B 7/1353 369/112.15 |
| 2006/0118707 A1 | 6/2006 | Schaake | |
| 2010/0157774 A1 | 6/2010 | Ren et al. | |
| 2011/0139971 A1* | 6/2011 | Phillips | G01B 11/26 250/231.13 |

OTHER PUBLICATIONS

The European Search Report for European Patent Application No. 17887137.2, dated Jun. 4, 2020, EPO, Munich, Germany.

* cited by examiner

Measured Focusing Error Signals (FE)

(a) For the 0.6mm disk.

(b) For the 1.2mm disk.

OPTICAL ENCODER SYSTEM AND METHOD

CROSS-REFERENCE TO RELATED APPLICATIONS

This application is a continuation of International Application No. PCT/US2017/068762 filed on Dec. 28, 2017 which claims the benefit of U.S. Provisional Application No. 62/439,714 filed on Dec. 28, 2016, the contents of which are herein incorporated by reference.

TECHNICAL FIELD

The disclosure relates generally to optical shaft and linear encoders, and particularly to an optical disc encoder system and a linear scale encoder system.

BACKGROUND

Rotary optical encoders are often used to measure the angular position of a motor shaft. Presently known rotary optical encoders devices employ optical detectors to monitor the motion of a disc that is attached to the motor shaft. The optical detectors and an associated light source are mounted within a read station, or head, which are fixed or locked in a stationary position with respect to the encoder housing. Typically the disc has a series of light and dark lines encoded on its surface which are illuminated in the region of the optical detectors by the light source. The portion of the disc demarcated is referred to as the track. As the illuminated disc rotates beneath the detectors, the amount of illumination impinging on the optical detector surfaces fluctuates. The amount of shaft rotation is determined by counting the number of intensity fluctuation sensed by the detector. Since the angular width of the lines is known at a particular radius on the disc, the arc length viewed by the head and the associated angular rotation of the disc may be determined.

There are fundamentally three optical arrangements which can be used. The first arrangement is a transmissive scheme wherein opaque lines are encoded on a transparent disc. The light source is placed opposite the optical detectors with the disc rotating between the two. In order to enhance contrast, a mask between the disc and the detectors may be employed and collimating optics to form a proper illumination beam may be used.

A second arrangement is to place the detectors and the light source on the same side of the disc. In this reflective scheme, the disc is constructed in a way that the disc reflects varying amounts of light back to the optical detectors. A variation on this arrangement involves applying the principles of interferometry. The disc is grooved so that the stripes on the disc lie in two planes distanced by a fraction of a wavelength of light. A third arrangement is similar, but is based upon principles of diffraction and interferometry. In this approach the disc is constructed so that it acts as a diffraction grating.

One limitation of conventional rotary encoders is their sensitivity to eccentricities in the disc or shaft relative to the detectors. These cause the radius from the center of rotation to the portion of the track being observed by the read stations to vary. In order to properly interpret the fluctuations in illumination in terms of arc length, one must have knowledge of the instantaneous radius throughout the sweep of the disc. Otherwise, the calculated or perceived rotation will deviate from the actual rotation. Given that the conventional rotary encoder has fixed heads, this deviation cannot be accounted for by the individual heads. In order to minimize sensitivity to this phenomenon, multiple heads are often used and the detected signals are averaged. However if the encoder track being monitored should deviate to such an extent that it lies outside the detector's field of view, no motion of the disc will be detected. Thus, eccentricity has a significant effect on accuracy.

Another limitation of conventional rotary and linear encoders is their sensitivity to variations in the distance between the optical reading head lens and the rotary disc or linear scale below the head. These variations, caused by disc/scale deviations from the tight surface flatness requirements and/or assembly flatness, restrict the ability of keeping the reading head lens appropriate distance from the encoder disc/scale, i.e., the lens depth of focus (DOF), and increase the cost of assembling and/or maintaining the encoder.

Therefore, it would be advantageous to provide a solution that overcomes at least the deficiencies noted above.

SUMMARY

Certain embodiments disclosed herein provide for an improved optical encoder that uses an optical pick-up unit that provides for a degree of freedom in at least one of the tracking and focus axes that are unavailable in conventional optical encoders to improve the encoders' performance. In an embodiment the encoder employs an optical disc marked with pits and lands which may be arranged in a spiral pattern. The optical disc is mounted on the shaft whose motion is to be monitored by the optical encoder. The encoder may be arranged to read the markings on the optical disc using the three-beam pickup method. In another embodiment, a marked optical substrate may be marked to detect linear motion corresponding to motion of the substrate.

One embodiment relates to an optical encoder that includes a light focusing element, a light detector that receives light from a substrate containing markings via the light focusing element and converts the received light into at least one electrical signal; a servomechanism that adjusts a position of the light focusing element based on the at least one electrical signal; and a processor that receives the at least one electrical signal and is adapted to report motion of the substrate based on the received at least one electrical signal.

One embodiment relates to an optical encoder that includes an encoder optical reading head comprising a light focusing element; and a dynamic steering actuator adapted to control positioning of the encoder optical reading head in response to light from a substrate containing markings so as to adjust focus and tracking of the light focusing element when reading data from an optical disc encoded with spiral data pattern track; whereby the encoder optical reading head is self-aligning.

One embodiment relates to an optical encoder that includes an optical disc mounted on a shaft, the optical disc containing pit and land markings, an optical pickup unit for an optical disc that receives light from the optical disc and supplies as an output an electrical signal representative of the received light, that includes a reading head objective lens, and dynamic steering actuators that control the focus and tracking of the reading head objective lens and a processor that receives as an input the electrical signal from the optical pickup unit and reports motion of the substrate based on the received at least one electrical signal.

One embodiment relates to an optical encoder that employs a self-aligning optical disc reading head to read data from an optical substrate carrying information encoded in pits and lands to determine a position of the optical substrate based on reading of the information by the optical disc reading head.

One embodiment relates to a method for use in an optical encoder having a light focusing element; a light detector that receives light from a substrate containing markings via the light focusing element and converts the received light into at least one electrical signal; and a servomechanism adapted to adjust a position of the light focusing element based on the at least one electrical signal; wherein the method comprises: responsive to the at least one electrical signal, adjusting the position of the light focusing element; and providing an electrical indication of motion of the substrate, the motion being determined based on the received at least one electrical signal.

Another embodiment relates to a method for use in an optical encoder having an optical reading head that includes a light focusing element, the method comprising: controlling a position of the encoder optical reading head in response to light from a substrate containing markings so as to adjust focus and tracking of the light focusing element when reading data from an optical substrate; and providing an electrical indication of motion of the optical substrate, the motion being determined based on light received at at least one optical to electrical converter in the encoder optical reading head.

BRIEF DESCRIPTION OF DRAWINGS

The foregoing and other objects, features, and advantages of the disclosed embodiments will be apparent from the following detailed description taken in conjunction with the accompanying drawings.

DETAILED DESCRIPTION

Figure 1:
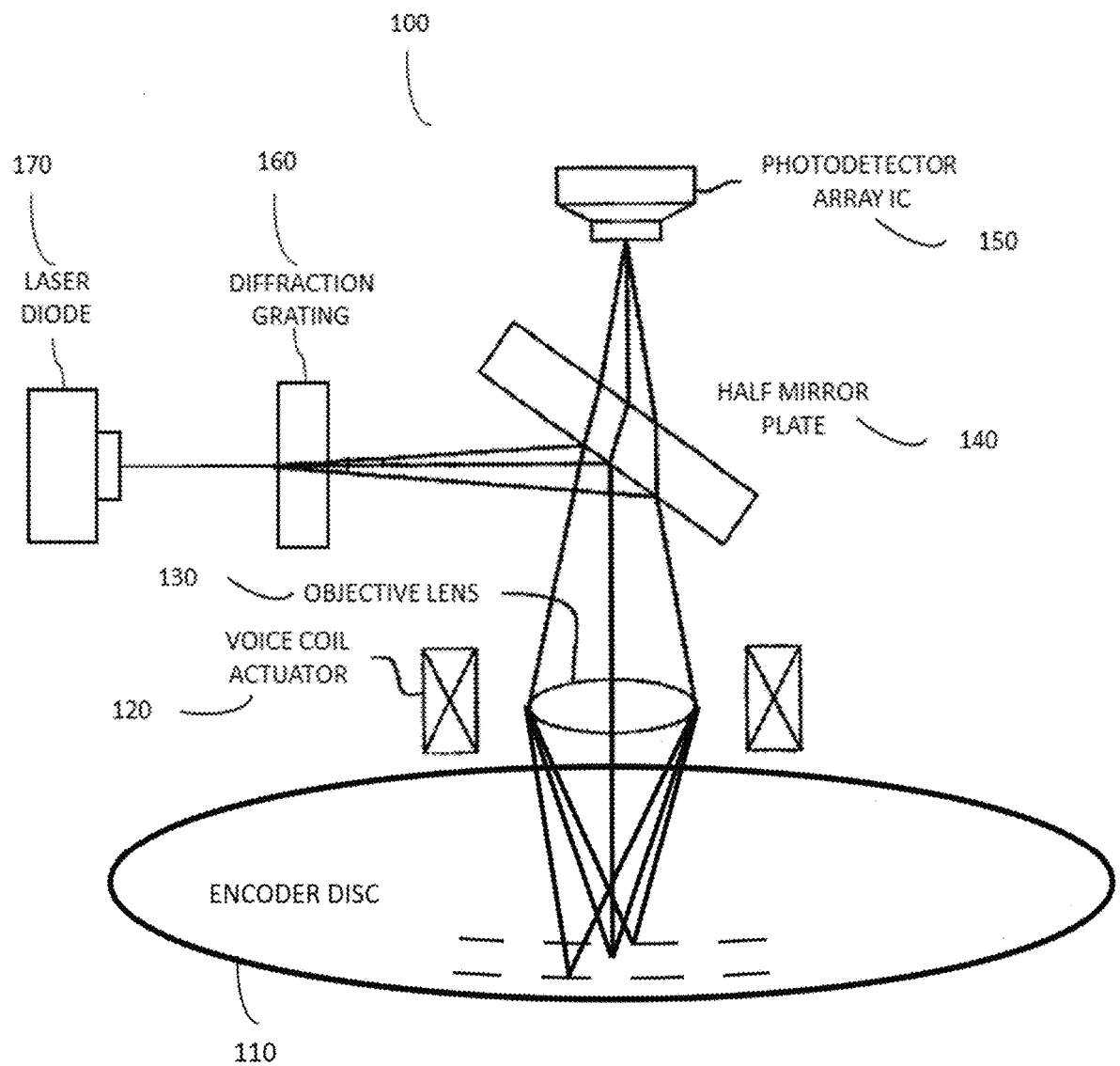
FIG. 1 is an isometric plan view of a portion of a typical optical rotary encoder according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

According to various disclosed embodiments, an encoder disc with a spiral data pattern track is employed. Because optical storage discs use mainly spiral data pattern tracks, the disclosed encoder allows reusing the optical storage production tools infrastructures in manufacturing the encoder disc and steering head.

In an embodiment, the disc and the encoder body have no direct physical connection. Further, no internal bearings are used, thus concerns about wear and lubrication are eliminated. Greater reliability is afforded as well, and concerns about contamination in clean environments are reduced.

In an embodiment, the encoder optical reading head incorporates dynamic steering actuators governing the focus and tracking of the reading head objective lens acquiring the encoder disc spiral data pattern track so the encoder reading head is actively self-aligning. Thus, warp and wobble in the disc are easily accommodated. External vibration, which might introduce misalignment between the encoder body and the disc, is also accommodated through the use of the focus and tracking actuators. This feature taken with the modular construction results in an encoder which is tolerant of external loads in general.

Despite the fact that the read station is now mechanized, reliability is not reduced substantially because the focus and tracking actuators are flexure mounted. There are no wear surfaces introduced by this additional mechanization.

Through the use of the Laser Optical Disc (LOD), two important features are gained. First, because a laser is used to encode the disc, much smaller markings may be encoded on the disc. A much higher resolution is therefore obtainable for an encoder of a given diameter. Even with a very small dimension of the encoder disc, a reasonable number of pulses per revolution can be generated. For example, an encoder disc with 20 mm diameter can achieve 14-bit resolution without interpolation and an encoder disc with 160 mm diameter can achieve 20-bit (1 arc-second) with 4 times quadrature multiplication. As recording techniques and materials are refined in the various types of mass media, like DVD, Blue Ray etc., this encoder concept may be adapted to the media offering the greatest bit density, so even higher resolutions are feasible. The second advantage afforded by using the optical disc along with the associated optics is that the disc is more tolerant of contamination and physical abuse. This is due to the convergent optical path and the fact that the information layer is within the disc rather than on the surface.

By providing the angular orientation sensing device as is disclosed herein, utilizing optical disc technology with actively tracking head station toward the angle encoding application, it is now possible to construct an encoder which offers numerous potential advantages over encoders of conventional design. Moreover, implementing a spiral data pattern encoder disc may provide the advantage of reuse of the optical storage manufacturing tools infrastructures and, as a result, reduction in cost of the disclosed encoder device and its production.

In an embodiment, an encoder disc with a spiral data pattern track is employed. A disc with a spiral track pattern layout can ensure that the two flanking beams of the three beams method of optical disc pick-up are projected on the track's data patterns, which maintain a ¼ cycle phase shift between each other. That is, the encoder quadrature signals generated from the two flanking beams allow extracting of direction discrimination out of the quadrature signals. The spiral track pattern disc also allows maintaining the required specified encoder density/resolution, which is the number of cycles/periods per revolution. The central beam of the three beams is projected on a disc area where grooves with no data pattern is introduced, except for possible index sign/signs, so that the focus and tracking error signals are not distorted as they might have been at low shaft encoder speeds when focusing on tracks with a data pattern.

The above holds true not only for the three beams method pick-up but also when using other different known in the art optical storage focus and tracking methods Optical Pick-Ups (OPU's), such as, for example, the beam size method, the Foucault method and the knife edge focus method OPU. As in the three-beam method pick-up the beam size method, the Foucault method and the knife edge method focus and tracking beams are projected on grooves area with no data pattern (except for possible index mark/marks as explained above and hereafter) on the disc/scale. The above holds for the use of variety of other techniques like the knife edge, the beam size method, the Foucault method and the three beams optical pick-ups, where the quadrature signals could be derived from either the three beams flanking sub beams cells or any other unrequired optical storage pick-up cells to be used for the disclosed encoders. As an non-limiting example, the dedicated beams and the photodetector cells for the tilt measurement, used in some optical storage pick-ups, may take the role of the flanking beams and the tracking photodetector cells E and F, the six segments detector array (FIG. 6) side cells of the above well-known three beams method pick-up, and be used as the reading photodetector cells of the spiral quadrature (¼ cycle phase shift) signals. The encoder disc spiral quadrature data pattern section width is limited and the tilt effect at it is negligible and there is no need for the use of the optical disc pick-up tilt measurement in the case of the disclosed encoder.

Because of the limited radial tracking mechanical range movement of the optical storage pick-up head, when the disclosed angular encoder, employing the optical storage pick-up, rotates continuously in the same direction along the disc spiral pattern track its objective lens will hit the wall of the OPU head radial axis mechanical range end. Some exemplary solutions for preventing the objective lens from hitting the reading head radial mechanical range end are described herein below.

Optical storage drives are typically adapted to operate with the disc rotating at a relatively high speed, either at constant linear velocity (CLV) mode or at constant angular velocity (CAV) mode. However, optical encoders typically must support any speed from zero to any desired speed. When adapting the optical storage technology to the field of optical encoders special care should be taken while operating the optical encoder disc/scale at full stop or running it at slow speeds. For example, data pattern on the track, on which the focus beam is projected, disturbs the focus performance when the encoder disc rotates at slow speeds, where the track pattern special frequencies fall within the focus actuator servo loop bandwidth. Some techniques applicable for eliminating the focus performance disturbances, when the encoder disc rotates at slow speeds while the focus beam is projected on track data pattern, are described herein below.

Another disclosed embodiment utilizes the advantages of the OPU head degrees of freedom in the tracking and focus axes in the optical encoder's field for improving the encoder' performance. Some of the encoder OPU reading head advantages, using the degrees of freedom in the tracking and/or focus axes, are described herein below.

The detector array of the well-known optical storage three beam method pick-up head includes two flanking elements which receive the reflections generated by the flanking beams. The radial position of the track relative to the main beam in the three-beam method may be determined using differential amplifiers which compare the level of illumination falling on each of the two skewed flanking elements. Thus, error signals are generated and fed back to the tracking actuator magnetic coil, which governs the radial position of the beam steering optics. Auxiliary tracking error information is also derived by evaluating the distribution of the illumination on the 4 central elements of the photo detector.

In an embodiment, the three beams are skewed, so the two flanking beams are over spiral tracks, which their pattern is in quadrature phase shift (90 degree out-of-phase) for extracting direction discrimination. In this approach the flanking beams skewing tracking technique, described in the previous paragraph, cannot be implemented. The auxiliary tracking error information derived by evaluating the distribution of the main beam illumination on the 4 central elements of the photo detector is used, while the flanking beams are over tracks, which their pattern is in a 90 degree out-of-phase, generating the quadrature signals for extracting direction discrimination. Other possible approaches for generating the out of phase quadrature signals for direction discrimination will be discussed herein below.

Figure 2:
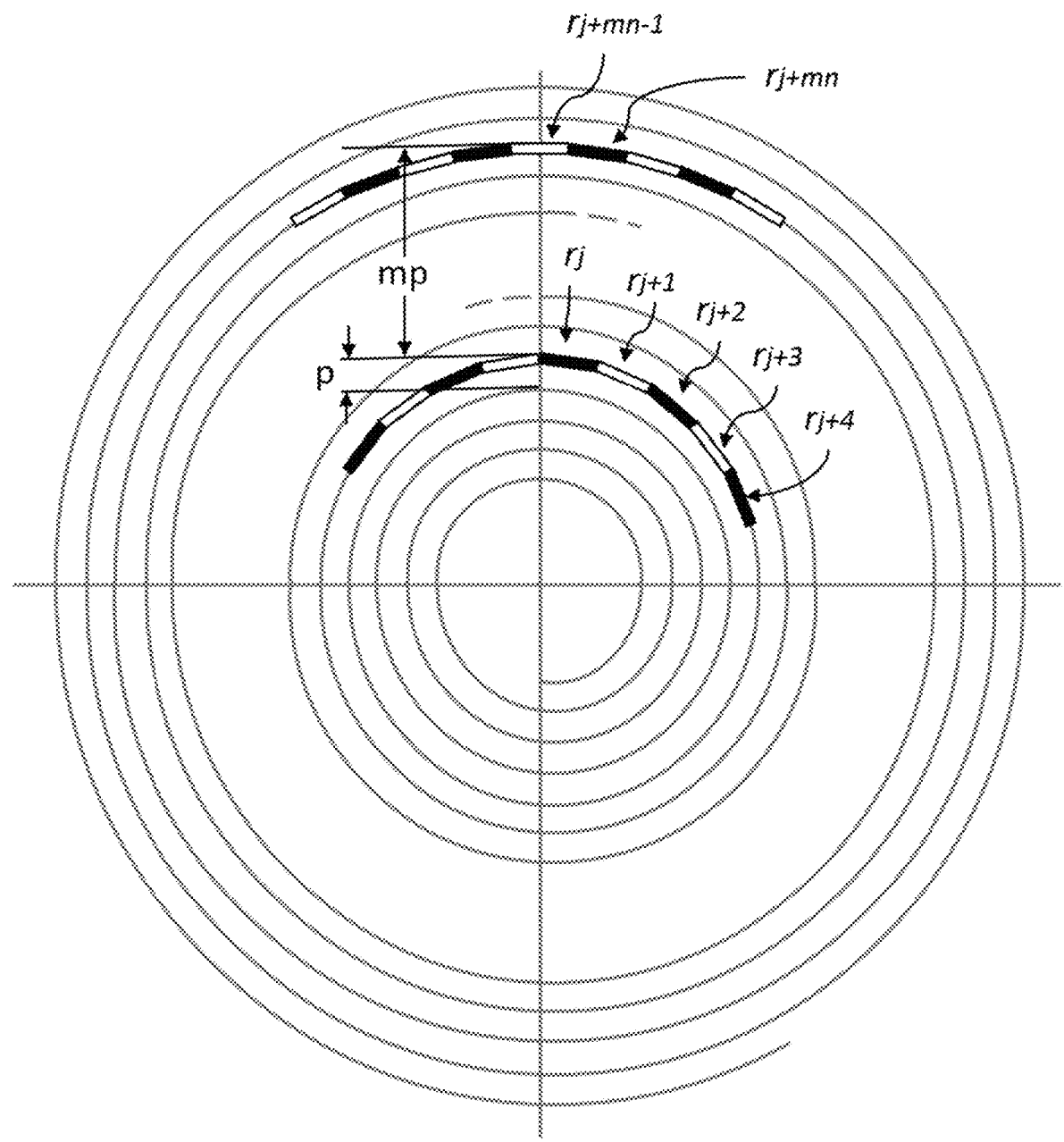
FIG. 2 demonstrates one optional disc design with a spiral track pattern layout.
Figure 3:
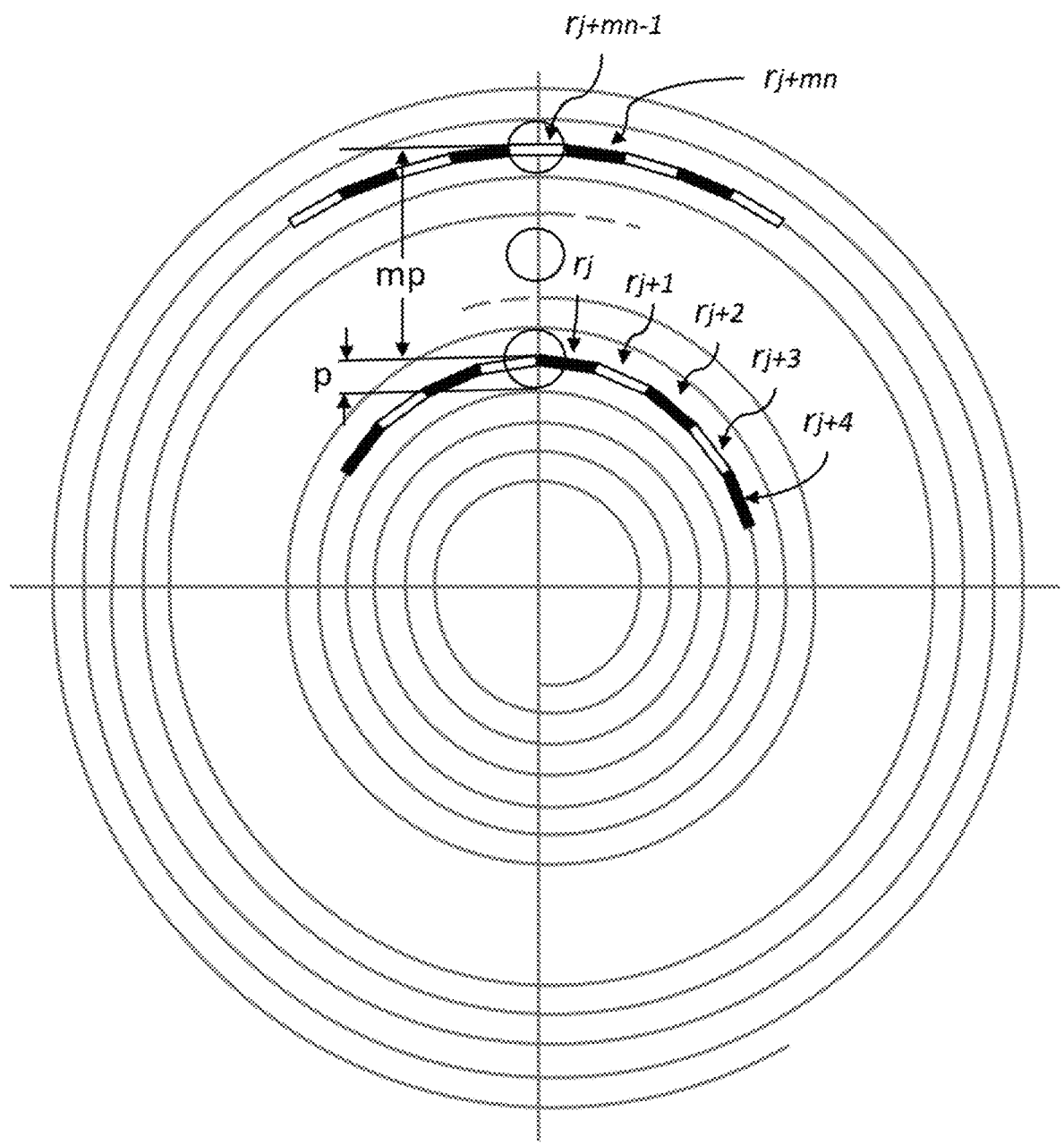
FIG. 3 shows the relative position of three beam light spots on the data pattern surface of the encoder disc of FIG. 2.
Figure 4:
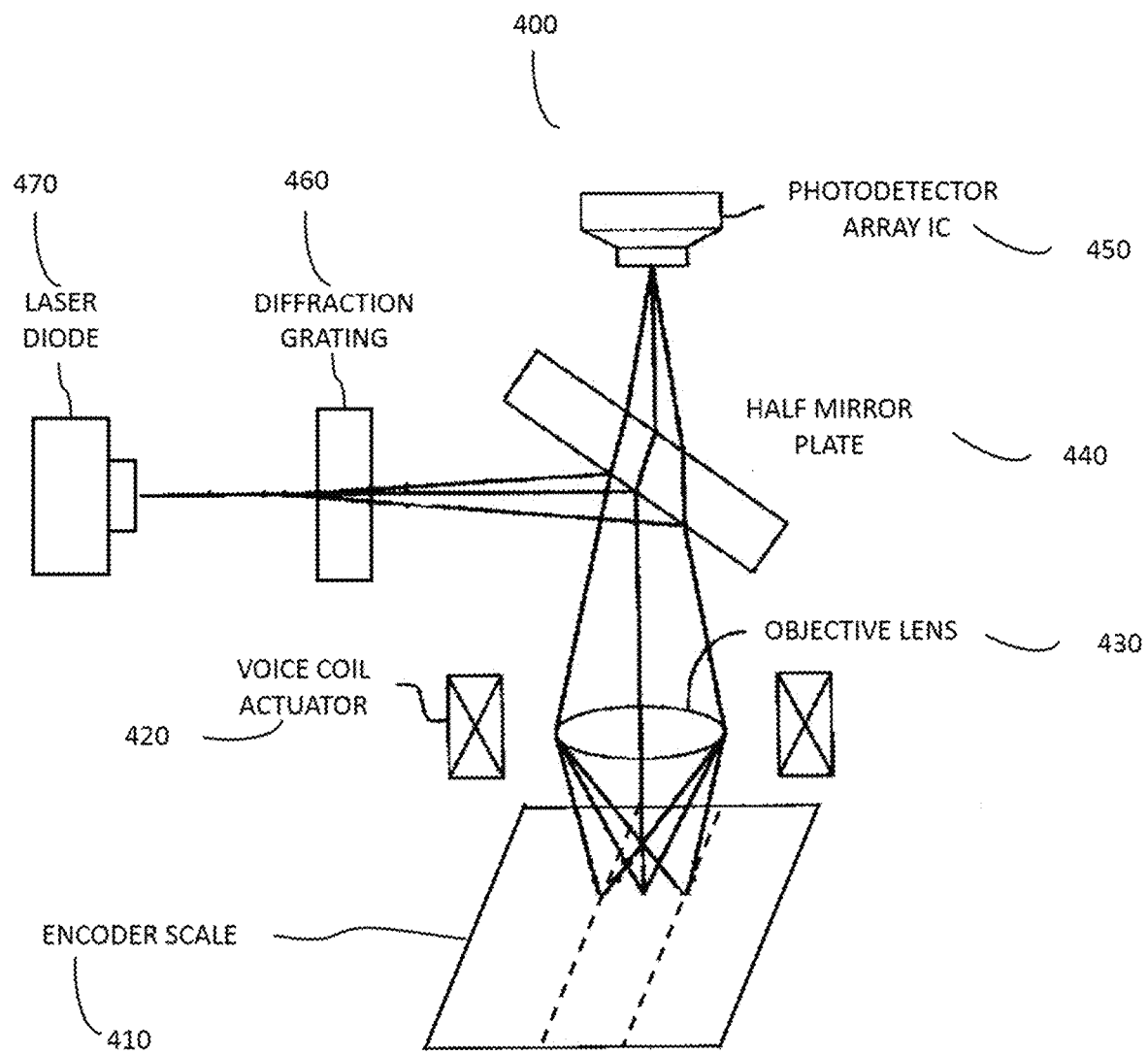
FIG. 4 is an isometric plan view of a portion of a typical optical linear encoder according to another embodiment.

FIG. 1 and FIG. 4 show non-limiting embodiments in the form of a rotary and a linear encoder, respectively. One embodiment of such an encoder disc is schematically shown in FIG. 2. One possible variation of the relative position of three spots on the data pattern surface of the encoder disc is shown in FIG. 3 (a figure identical to FIG. 2 on which the position of the three spots is shown).

FIG. 1 illustrates an isometric plan view of a portion of a typical optical rotary encoder 100 according to an embodiment. The typical optical rotary encoder comprises an encoder disc 110 configured to be encoded. The encoder further comprises voice coil actuators 120 controlling an objective lens 130 tracking and focusing axes. The half mirror plate 140 reflects the input beam from the laser diode 170 passing through the diffraction grating 160, which generates the three beams out of it, towards the objective lens 130 that focuses the three beams on the encoder disc 110. The half mirror plate 140 also transmits the laser beam reflected back from the encoder disc 110 passing through the objective lens 130 towards the photodetector array IC 150.

FIG. 2 demonstrates one possible disc spiral track layout. FIG. 3 represents the case of a three-beam method OPU (Optical Pick-Up), where the OPU three beams are projected on the disc along the disc radius. In FIGS. 2 and 3 the spiral track patterns upon which the two flanking beams are projected are 'm' pitches (mp) apart from each other. The annotations of FIG. 2 and FIG. 3 represent the case where the track pattern layout corresponds to an encoder disc with n periods/cycles per revolution. The central beam of the three beams is projected on a disc grooves area where no data pattern is introduced, except for optional index signs, so that the focus and tracking error signals are not distorted as they might have been at low shaft encoder speeds in the case of focusing on tracks with a data pattern.

FIG. 4 illustrates an isometric plan view of a portion of a typical optical linear encoder 400 according to another embodiment. The typical optical linear encoder comprises scaling grating 410 configured to be encoded. The encoder further comprises voice coil actuators 420 controlling an objective lens 430 tracking and focusing axes. The half mirror plate 440 reflects the input beam from the laser diode 470 passing through the diffraction grating 460, which generates the three beams out of it, towards the objective lens 430 that focuses the three beams on the encoder scale grating 410. The half mirror plate 440 also transmits the laser beam reflected back from the encoder scale grating 410 passing through the objective lens 430 towards the photo-detector array IC 450.

Figure 5:
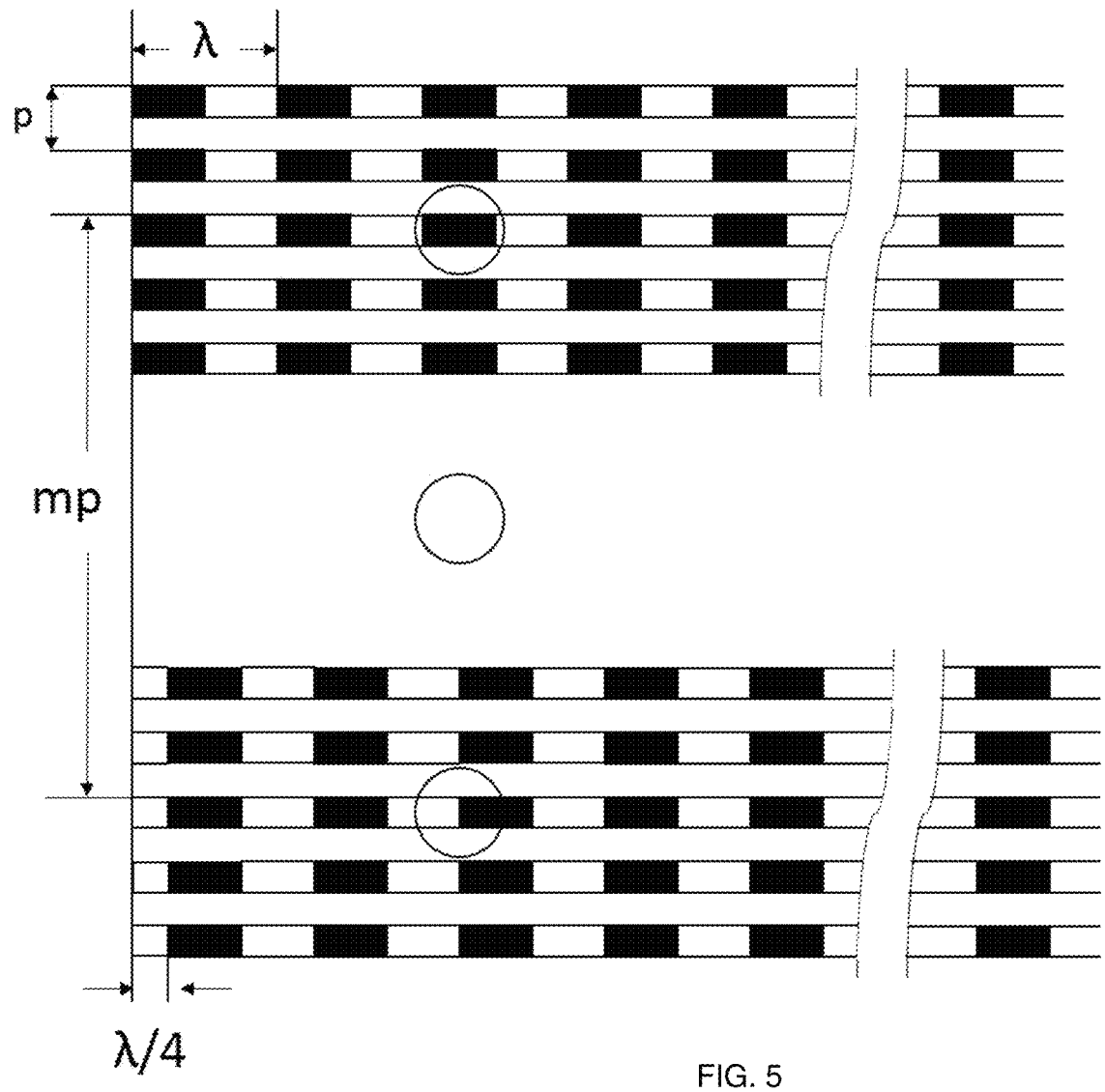
FIG. 5 is a diagram of a linear encoder scale grating illustrating the relative position of the three beam light spots on the surface of a scale grating according to another embodiment.

FIG. 5 illustrates the tracks layout and the relative position of the three beam spots on the data pattern surface of an encoder linear scale according to an embodiment where λ is the data track pattern period, p is the pitch between data pattern tracks and m is the number of data pattern track pitches distance between the three beam flanking beams. In accordance with this embodiment, the three beams central beam of the embodiment is projected on free of data pattern tracks grooves region (except for possible index mark/marks as explained above and hereafter).

In an embodiment, the height difference between the pits and lands of the encoder phase grating disc/scale is one-quarter of the laser wavelength. To obtain an approximate sinusoidal wave, the length of the pits and lands of the encoder disc spiral or linear scale track pattern should be slightly less than the focused spot size of the laser beam. The limited spiral pattern section width in the radial direction ensures that the above spot size relative to the pit length is maintained with the pit length variations as a function of the spiral radius required for keeping the encoder specified density (the number of cycles/periods per revolution).

The design of the disc spiral track pattern layout may be such that the two flanking beams are projected on track's data patterns, which maintain a ¼ cycle phase shift between each other. That is, the encoder quadrature type signals generated from the two flanking beams allow extracting of direction discrimination out of the quadrature signals. The disc design also allows maintaining the required specified encoder density/resolution, n, which is the number of cycles/periods per revolution.

Figure 6:
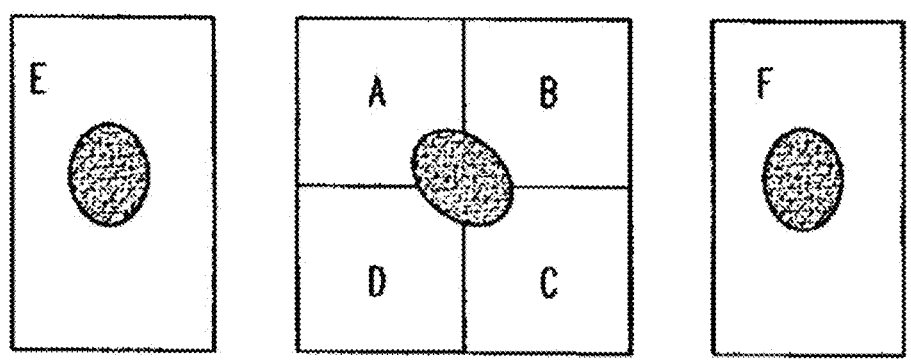
FIG. 6 is a diagram of a six-segment photo detector.

The six segments (A, B, C, D, E, F) detector array of the well-known optical storage three beam method pick-up head includes two flanking elements (E and F), which receive the reflections generated by these skewed flanking beams is shown in FIG. 6 in connection with the use made of the three-beam method in various embodiments of the optical encoder disclosed herein. The radial position of the track relative to the main beam in the three-beam method may be determined using differential amplifiers which compare the level of illumination falling on each of the two flanking elements. Thus, error signals are generated and fed back to the tracking actuator magnetic coil which governs the radial position of the beam steering optics. Auxiliary tracking error information is also derived by evaluating the distribution of the illumination on the 4 central elements (A, B, C, D) of the photodetector array of FIG. 6. The focus error signal, which governs the pick-up head focus actuator, is also derived by evaluating the distribution of the main beam illumination on the 4 central elements (A, B, C, D) of the photo detector array.

In one non-limiting example, skewing the three beams is employed so the two flanking beams are over tracks, which their pattern is in quadrature phase shift (90 degrees out-of-phase) for extracting direction discrimination. In this approach the flanking beams skewing tracking technique, described in the previous paragraph, cannot be implemented. The auxiliary tracking error information derived by evaluating the distribution of the main beam illumination on the 4 central elements of the photo detector is used, while the flanking beams are over tracks, which their pattern is in 90 degree out-of-phase, generating the quadrature signals for extracting direction discrimination. The encoder spiral pattern layout is such that the pits and lands are equal in length, up to the slight change with the track radius required to maintain the specified number of cycles per revolution. Designing the OPU diffraction grating is such that rotation in the appropriate angle will skew the two side beams in the appropriate angle to generate the desired quadrature signals for extraction of direction discrimination.

Figure 10:
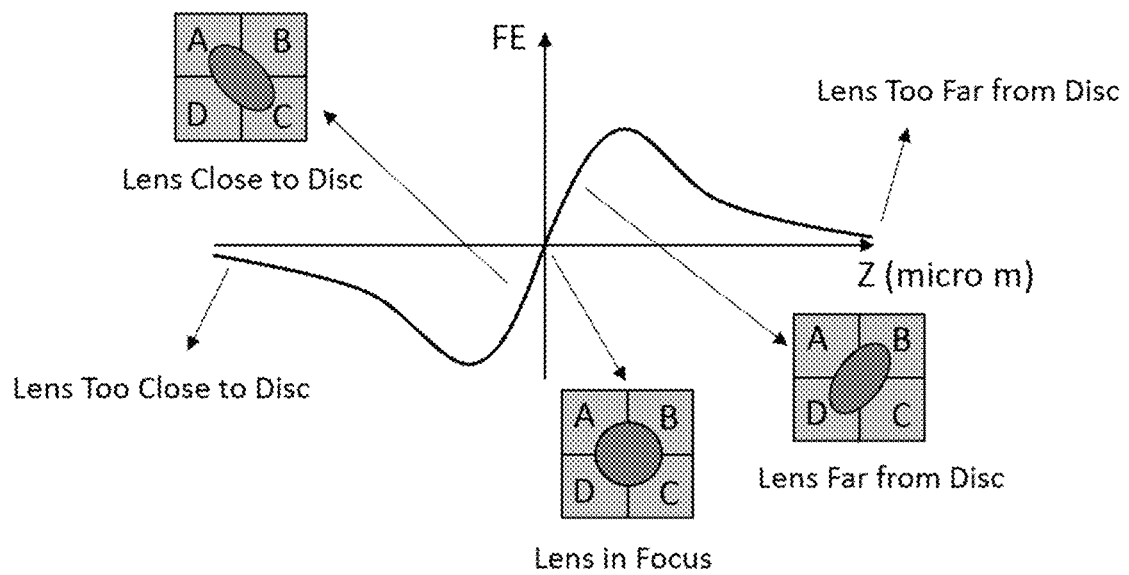
FIG. 10 demonstrates the astigmatic three beams method focus error S-curves (FE) for a typical arrangement of four detectors utilized to describe various embodiments of the optical encoder disclosed herein.
Figure 11:
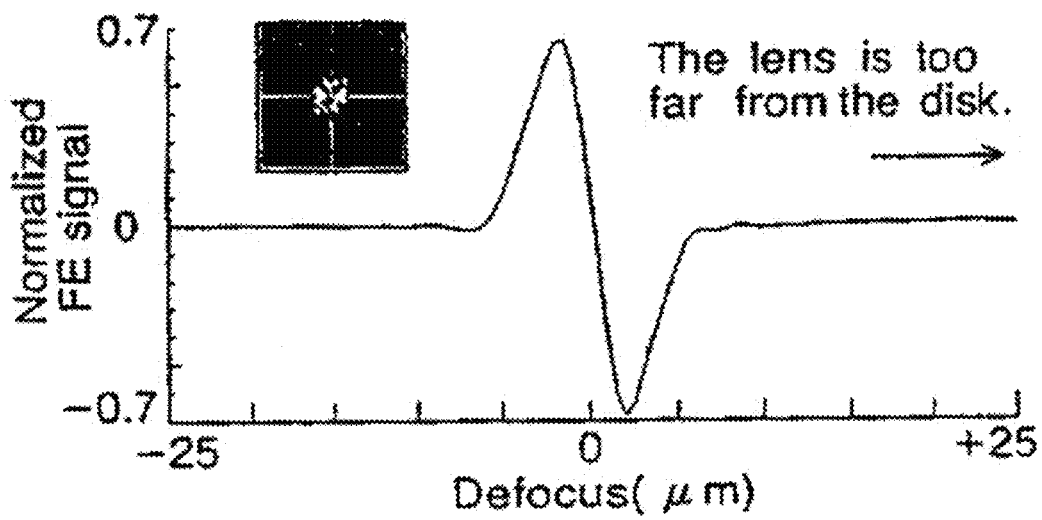
FIG. 11 illustrates measured focus error S-curves signals (FE) utilized to describe various embodiments of the optical encoder disclosed herein.
Figure 11:
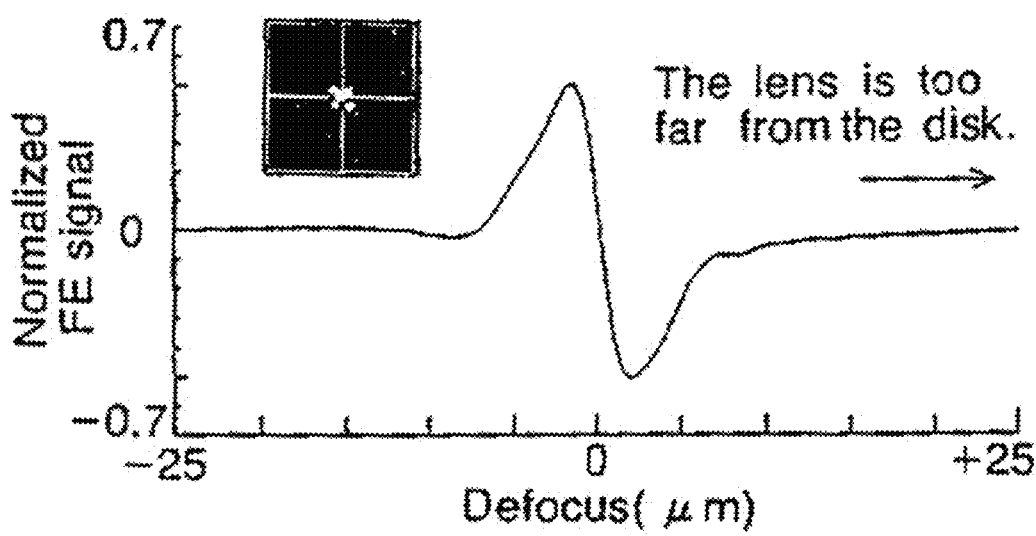

The well-known astigmatic three beams method focus error (FE) for a typical arrangement of four quadrants detector is demonstrated herein in FIG. 10 in connection with the use made of the three-beam method in various embodiments of the optical encoder disclosed herein. Note the characteristic S-curve generated when the lens is moved up and down. The objective lens is astigmatic diagonally, giving the lens a different focal point along each diagonal. When the track to be read is between the two focal points, which is the desired read position, the spot on the detector is circular. However, when the lens moves away from this position, the spot moves toward one or the other focal point, thus shortening the spot along one axis and lengthening it along the other, which creates an elliptical spot as is shown in FIG. 10. The FE signal is calculated from the intensity reaching each quadrant of the detector as FE=A+C−(B+D). As the lens moves up and down, the FE is expected to have the S-curve behavior shown in FIG. 10. The error is linear with distance close from the track, within a range of about 10 μm. Beyond this point, the reflected signal becomes diffuse and the FE signal goes back to zero. The spot is circular at focus and elliptical when away, while the focus-error signal is small in magnitude when the objective lens is far away from the disc or close to the disc as the reflected beam becomes diffuse and the FE signal goes back to zero. The FE signal can be supplemented with another signal measure to optimize focus position for the read processes. For the read process, maximizing the total signal strength A+B+C+D is relevant. The location of these maxima versus FE are measured and applied as an offset to the desired FE in the servo focus loop. FIG. 11 illustrates measured focus error S-curves signals (FE) which may be employed in various embodiments.

Figure 7:
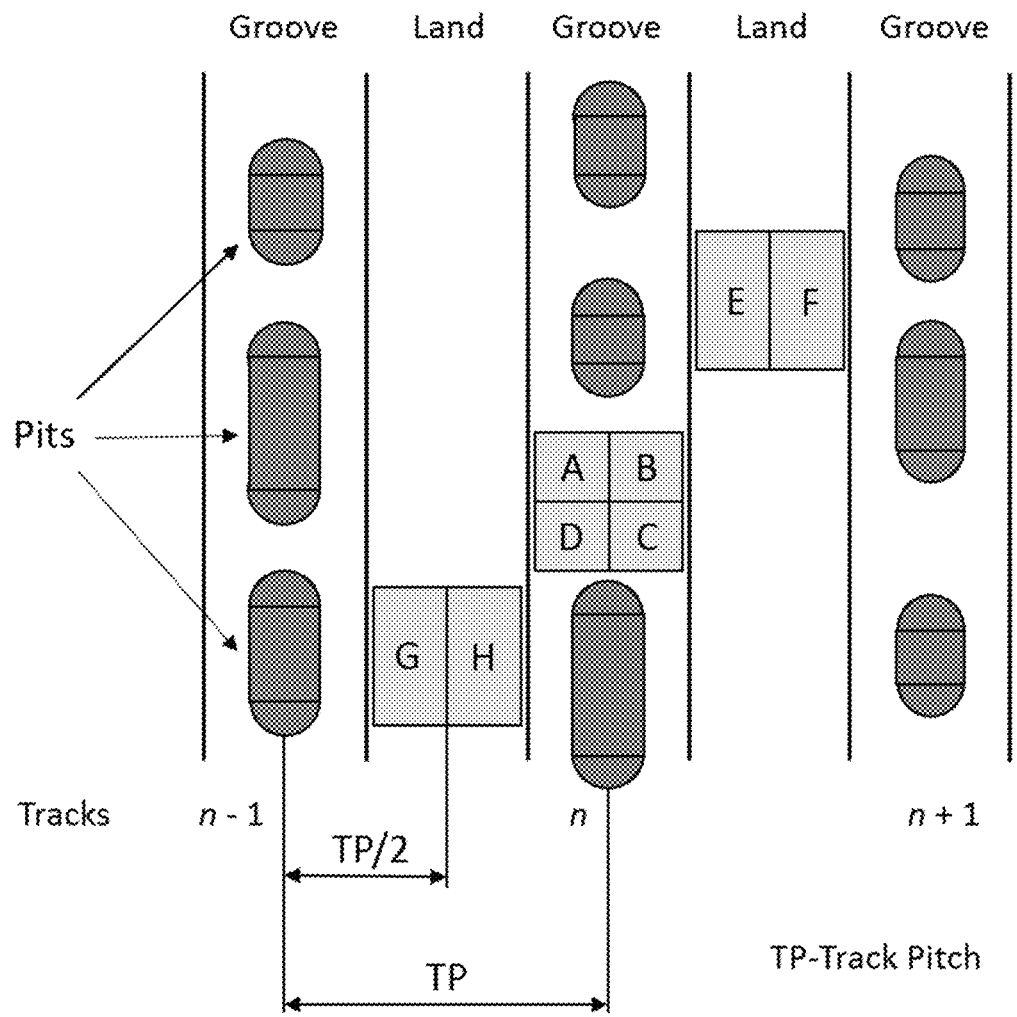
FIG. 7 is an illustration of the placement of groove, land, pits, and detectors, including main detectors versus side detectors half a track away

FIG. 7 illustrates the placement of groove, land, pits, and corresponding locations of the detectors as they may be positioned above the disc in the read head, including main detectors versus side detectors half a track away, as may be employed in various embodiments. The pits are placed at the center of the groove. The side detectors help measures more accurate tracking error signals. Each side detector can be either one detector (like the E and F detectors of FIG. 6 that are used in the most common case of the three-beam method and which may be used in various embodiments) or a set of two (as shown on FIG. 7, which may be used in various embodiments) or four photo diode detectors (which may be used in various embodiments). The main detectors are placed to be receiving a signal substantially from the center of the tracks, while the side detectors are placed to be receiving a signal substantially from the center of the land, which is also called the half-track. This diagram shows three tracks.

Figure 8:
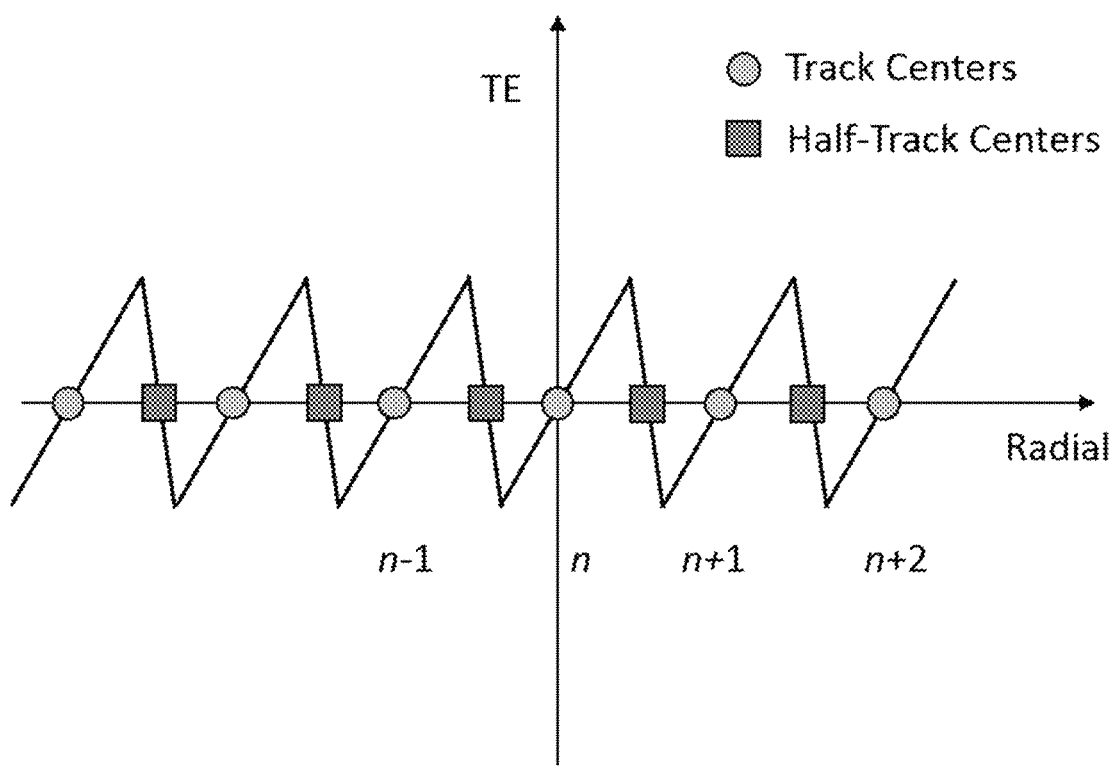
FIG. 8 shows the tracking error (TE) signal, based on differential phase detect (DPD), sweeping the lens over tracks.
Figure 9:
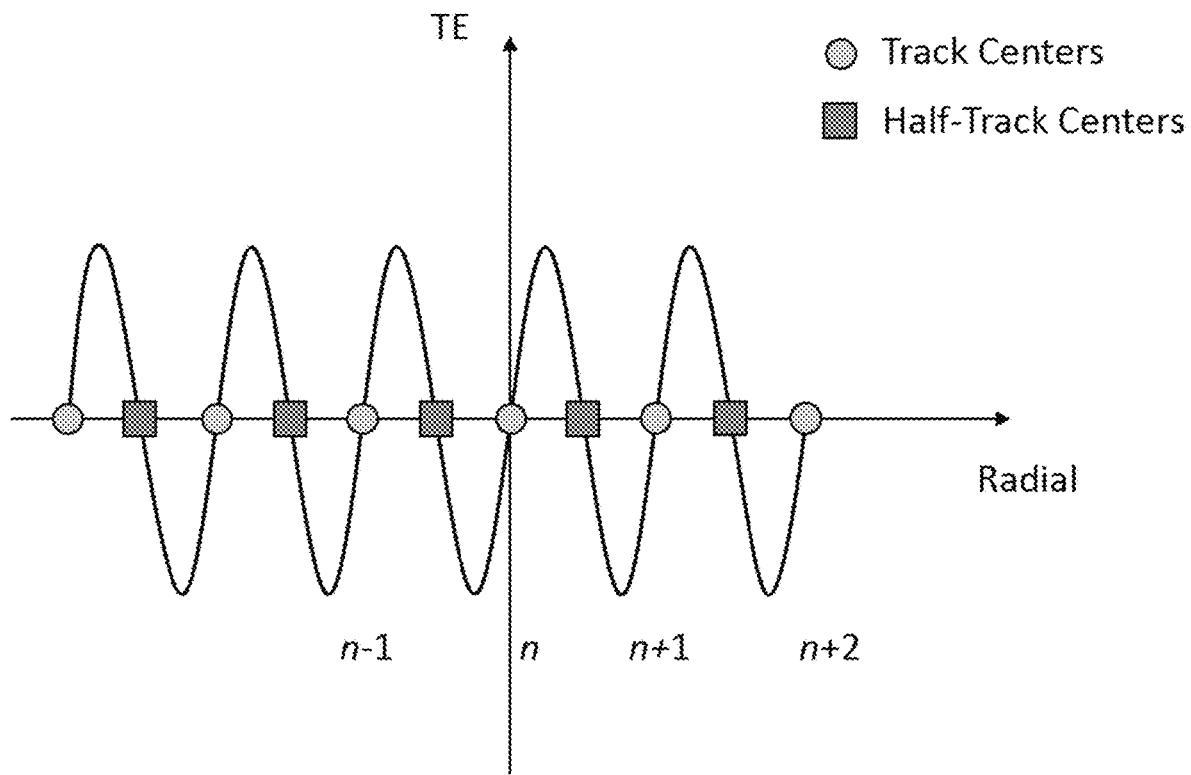
FIG. 9 shows the tracking error (TE) signal, based on differential push pull (DPP), sweeping the lens over tracks.

FIG. 8 and FIG. 9 show the tracking error (TE) signals of the well-known differential phase detect (DPD) and the differential push pull (DPP) methods, respectively, which may be used in various embodiments. These TE signals are calculated from the intensity reaching each quadrant of the main (central), e.g., four quadrant detector shown in FIG. 7.

FIG. 8 shows the tracking error (TE) signal, based on differential phase detect (DPD) method, when sweeping the lens over tracks. The differential phase detector (DPD) requires data pits on the disc and is not applicable to a blank disc, since blank discs have no pits. The phase difference of the diagonal terms S1 and S2, defined by S1=A+C and S2=B+D, is used to indicate how well the laser spot is located over the track. When the laser spot is perfectly centered over the track, the signals S1 and S2 plotted versus time are aligned; that is, the phase shift between the signals is zero. However, when the detector deviates to the left or the right, a phase difference between the diagonal terms is present.

For example, consider the configuration in FIG. 7 with the detectors offset to the right of the track while the track motion is downward. In this case, the B and C detectors do not see as much of the data pits, and the reflected light intensity is fairly steady. On the other hand, detectors A and D receive the majority of light reflected from the pits, while D lags A due to its relative position, giving rise to a phase difference between signals S1 and S2. The magnitude of this delay is proportional to TE. Likewise, when the four detectors deviate to the left, B and C receive the majority of the reflected light, and B leads C. This technique requires that the disc have pits. The DPD response is largely linear with respect to TE.

As shown in FIG. 8, sweeping the lens over several tracks, results in a piecewise-linear DPD signal. The tracking error signal is capable of showing only the distance from the track center or half-track center. Sweeping the lens over tracks generates a tracking error signal that can be used to count the number of half-tracks.

FIG. 9 shows the tracking error (TE) signal, based on differential push pull (DPP) method, when sweeping the lens over tracks. The differential push-pull (DPP), which does not require that the disc contain data pits but instead relies on the difference in reflective properties between the region where data is supposed to be written, called the groove, and the remainder of the disc, that is, the land. In this method the intensity of light received at the detectors on the left side is compared against the ones on the right side. With four detectors, this comparison is given by A+D−(B+C). The tracking error calculated in this method has a sinusoidal appearance. Similar to the tracking error calculated with the differential phase detect (DPD) method, zero crossings can be used to count the number of half-tracks during a radial seek move, which represents the radial traveled distance. In an embodiment, the measured radial traveled distance along with the required offsetting voltage to the tracking actuator and the tracking error signal information is used for compensating/reducing the encoder accuracy sensitivity to expansion with temperature shift as is explained later bellow.

Another embodiment of laying out the three beams on the same track, while designing the OPU diffraction grating so that the flanking beams generate the required quadrature signals for extracting direction discrimination, will be discussed later below.

The above holds true not only for the three beams method pick-up but also when using other different known in the art optical storage focus and tracking method OPUs, like the beam size method, the Foucault method and the knife edge focus method OPU. The dedicated beams and the photodetector cells for the tilt measurement, used in some optical storage pick-ups, may take the role of the flanking beams and the tracking photodetector cells E and F of the above well-known three beams pick-up method and be used as the reading photodetector cells of the quadrature signals.

The encoder disc spiral quadrature data pattern section width is limited and the tilt effect at it is negligible and there is no need for the use of the tilt measurement in this case. As in the three-beam method pick-up the beam size method, the Foucault method and the knife edge method, the focus and tracking beams are projected on grooves area with no data pattern (except for index mark/marks as explained above and hereafter) on the disc/scale. The above holds for the use of variety of other techniques like the beam size method, the Foucault method, the knife edge and the three beams optical pick-ups, where the quadrature signals could be derived from either the three beams flanking sub beams cells or the unnecessary tilt measurement cells, or any other optical storage pick-up unrequired cells being implemented in the disclosed optical encoder for quadrature signal reading.

Because of the limited radial tracking mechanical range movement of the optical storage pick-up reading head, when the angular encoder disc rotates continuously in the same direction along the disc spiral pattern track, the encoder head objective lens hits in some point the wall of the OPU reading head radial axis mechanical range end. The following embodiments are applicable engineering alternative solutions for preventing the head objective lens from hitting the radial tracking mechanical range end:

(a) The encoder spiral pattern track is laid out in a predetermined disc radius along a radius range, which is smaller than the width of the OPU radial axis mechanical range.

(b) Execution of an OPU tracking mechanism radial jump away from the OPU wall edge toward the center of the radial mechanical range at a certain deviation from the center, based on the increasing drive voltage to the tracking radial actuator exerted with the deviation from the center of the tracking radial mechanical range.

(c) Using a sled carrying the OPU in the radial direction, which is a commonly known technique used in optical storage drive, eliminates the need for the execution of the OPU tracking mechanism radial jump—item (b) above—in the expense of some complexity and cost. As in the optical storage drive, the sled control will be slaved to the OPU radial tracking axis error.

Data pattern on the track, on which the focus beam is projected, disturbs the focus performance when the encoder disc rotates at slow speeds, where the track pattern special frequencies fall within the focus actuator servo loop bandwidth.

Several possible embodiments to ensure undisturbed focus performance at low encoder disc speed are also disclosed. The embodiments include, for example:

(A) Implementation of an adaptive focus servo loop bandwidth that is narrowed with the reduced disc speed using the quadrature signal frequency as a measure for the disc speed according to which the focus servo loop bandwidth is controlled (narrowing the focus servo loop bandwidth as function of the encoder disc velocity at lower encoder disc speed will not degrade the required focus performance).

(B) Free of data pattern tracks grooves area laid out between the quadrature patterns data tracks regions, which are in ¼ cycle phase shift between each other, as shown in FIG. 2. The free of data pattern tracks grooves area may contain a land (or a long pit) only pattern except for a possible index mark pit (or land), one per revolution, synchronized with the quadrature pattern period produced according to the spiral track pattern layout design.

(C) Multiple index marks per encoder revolution are laid out in the area of free pattern data tracks between the quadrature pattern tracks, like the one described above. These multiple index marks are separated between each other along the track enough distance, so that their disturbance frequency at low disc speeds are low enough to be easily filtered from the servo focus error signal eliminating any servo loop focus disturbances. Multiple index marks are used to recover from any possible miscount, which may be encountered during a radial jump, in the attempt to eliminate the problem of the OPU limited radial tracking mechanical range, as described in item (b) above. The layout of the multiple index area width are designed in such way that upon the radial jump mentioned above the focus beam after executing the jump will still reside above a data free pattern area. Finding the next adjacent index will allow identifying the exact angular position count and recover from any possible miscount.

The OPU reading head degree of freedoms in the tracking and focus axes could farther be used in the optical encoders' field for improving the encoders' performances. Some of these encoder OPU reading head advantages are described in the following embodiments:

(1) Use of the auto-focus axis information of the OPU displacement from the encoder scale/disc. Using the auto-focus objective lens actuator drive voltage along with the auto-focus S-curve (FIG. 10 and FIG. 11) servo control displacement error information for calibrating the encoder scale/disc flatness and use it for correcting possible displacement cosine errors. Taking advantage of the above feature may allow to either improving the encoder accuracy or relaxing the encoder scale/disc flatness (either the scale/disc flatness itself or/and the assembly flatness) requirements.

(2) Use of the auto-focus S-curve signal along with the objective lens actuator drive voltage information as a fine position measurement of linear encoders used in multi-axes stage systems. For example, the X axis auto-focus S-curve servo control error along with its objective lens actuator drive voltage information is a fine position measure of the Y axis displacement of an X-Y stage, which isn't sensed by the Y axis encoder transitions count. Vice versa, the Y axis auto-focus S-curve servo control error along with its objective lens actuator drive voltage information is a fine position measure of the X axis displacement of an X-Y stage, which also isn't sensed by the X axis encoder transitions count. It should be noted that this may require the calibration of the X and Y encoders' scales flatness using the Y and X respectively axis auto-focus S-curve servo control errors along with their objective lens actuators drive voltages information.

(3) Use of the OPU reading head tracking degree of freedom for scanning the axis perpendicular to the direction of motion for reading the radial information/code of absolute optical encoder scale or disc.

Several additional embodiments for using the OPU radial axis degree of freedom may be implemented, for example, but without limitation:

(a) Use of a low resolution absolute encoder pattern for coarse absolute measurements and then use of the high resolution incremental encoder quadrature pattern for the fine measurements.

(b) Use of a coarse absolute encoder pattern for the power-up/restart initialization procedure and then use of the optical encoder incremental quadrature pattern for the high-resolution position measurements.

The specified highest accuracy of linear scales in optical encoder vendors' catalogs is limited up to a certain maximum length of the scales. That is, for the same encoder family, the higher the specified accuracy the shorter is the scale length range for which this accuracy available. The main reasons for this are the required scale substrate, coefficient of expansion and mounting specifications for: (1) keeping the scale distance from the reading pick-up head lens within the lens Depth of Focus (DOF) along the whole scale length; (2) reducing the encoder accuracy sensitivity to temperature expansion. The following embodiments solve the above limitations:

The embodiment of implementing the optical encoder reading pick-up head with dynamic self-aligning auto focus eliminates the limitation ((1) above) and cost of maintaining the encoder scale stringent flatness/straightness requirements over a long encoder scale length (either the scale flatness/straightness itself or its assembled flatness/straightness). This keeps the scale within the reading pick-up head lens DOF along the whole scale length.

According to certain other embodiments, the following techniques, utilizing the unique pick-up head tracking axis degree of freedom for reducing the encoder accuracy sensitivity ((2) above) to expansion with temperature, may be implemented in the disclosed encoders:

(a) Use of the required OPU tracking actuator voltage for offsetting the objective lens a unit radial distance as a measure for the temperature expansion. In other words, use it as a gauge for measuring the expansion effect with the temperature relative to the scale production temperature, by measuring the required objective lens tracking actuator voltage difference for offsetting the OPU lens a radial unit distance or a predetermined number of track pitches.

(b) Use of the tracking error S-curve (FIG. 9 for example) signal information (monitoring its slope, for example) together with the tracking actuator voltage information for offsetting the objective lens a radial unit distance or a predetermined number of track pitches.

(c) Compensation of the expansion with temperature by certain calibration techniques using the radial/perpendicular degree of freedom of the OPU tracking axis. For example, adding a limited length scale of less sensitive to temperature material (for example, Quartz, Zerodur, etc.) for calibration, perpendicular to the usable measuring scale pattern. Reading it by offsetting the OPU objective lens in the radial/perpendicular direction (using a combination of its additional tracking degree of freedom with possible moving the whole OPU head), while the objective lens is above the limited length scale of less sensitive to temperature material.

(d) Both or part of the above techniques may be implemented simultaneously.

In another embodiment, an adaptive focus servo loop bandwidth that is narrowed with the reduced encoder disc speed (as mentioned above) is implemented. Using this technique, which ensures undisturbed focus servo loop performance at low encoder disc speed even when the focus beam is on a patterned data track, allows laying out a simpler encoder disc spiral pattern.

In yet another embodiment, the three beams are skewed so the two flanking beams are over tracks, which are in quadrature phase shift for extracting direction discrimination, with the adaptive focus servo loop bandwidth technique, it's possible to generate the quadrature (¼ cycle phase shift) signals while aligning the three beams on the same track without skewing the beams and using the central four quadrature detector for both focusing and tacking. It's done by designing the OPU diffraction grating element, which generate the three beams, so that the two flanking beams projected on the encoder disc spiral track maintain a distance between each other of $k\lambda+\frac{3}{4}\lambda$, where $\lambda$ is the period of one encoder cycle and k is an integer (0, 1, 2, 3 . . . ).

It should be noted that controlling the displacement distance between the satellite beam spots is implemented through the design and/or rotation of the diffraction grating element. In this approach the pits and lands are laid up on the spiral track in equal lengths ($\Delta/2$) up to the required slight incremental change in length as function of the disc radius in order to keep the desired specified encoder density, which is the number of cycles/periods per revolution of the encoder.

It should be further noted that in this arrangement there is no provision for implementation of a simple index signal. Various index patterns, which are uniquely identified, are possible to implement. Also the limited spiral pattern section width in the radial direction ensures that the controlled displacement distance between the satellite beam spots maintains the ¼ cycle phase shift of the quadrature signals along with the required slight incremental change in the pits/lands length as function of the disc radius in order to keep the desired specified number of cycles per revolution of the encoder. This is because the change in the pits/lands length as function of the disc radius is negligible relative to their length since the radial width of the spiral pattern section is small and the spiral radius change within the spiral pattern section is negligible as the spiral pitch is very small.

Besides the angular positions per revolution, multi-turn position encoders also measure multiple rotations or turns. In another embodiment, an encoder disc spiral pattern layout may be utilized to implement a multi-turn type of encoder. More specifically, by employing a spiral type disc with unique indexing, e.g., for each turn of the spiral, for both measuring the encoder angular position per revolution and the number of encoder disc turns the functionality otherwise achieved by conventional multi-turn position encoders is achieved. The main beam is used to read the index and the flanking beams are used for the number of cycles per revolution as explained herein.

An encoder disc for use in the disclosed laser encoder can be fabricated from a wafer by a lithographic technique. To improve the reflectivity of the wafer, a high reflectance metal layer, typically aluminum or gold could be used as a covering. The encoder disc can also be fabricated from glass. In an embodiment, the most convenient way to fabricate the encoder disc is to utilize the state of the art optical storage like Compact Disc (CD), Digital Versatile Disc (DVD), and Blue Ray (BR) construction. This would make mass production easy and the cost would be very low. An improved modification of the optical storage production tools, like the ones of CD and DVD, etc., to support flexible encoder disc diameters will allow using the existing optical storage manufacturing tools while accommodating the desired flexibility of producing variety of encoder disc diameters of different optical encoder's production batches. A manufacturing flexibility of programming the tools jobs to producing series of discs of variable diameters and volumes is desirable.

The optical storage OPU (Optical Pick-Up) objective lens is optimized by design to compensate the beam optical path towards the information layer within the disc PC (Poly Carbonate) layer. Existing conventional optical encoder discs with concentric data track pattern on their surface can also be read by the optical disc OPU utilizing the advantages of its additional dynamic degrees of freedom. It is possible to use the existing optical storage OPU objective lens as is for reading the current common used encoder scale/disc technology while introducing the necessary offset voltage to the objective lens focusing actuator. Using a modified optical storage OPU objective lens design without the above built in compensation for the optical path within the disc PC, which will be used for the existing conventional encoder disc, is also an alternative in which the above required offset voltage to the objective lens focusing actuator is unnecessary. When using an existing conventional encoder disc/ scale, where the tracks pattern is on the disc/scale surface, there is no need for the tracking function and the tracking actuator may be degenerated, because in the conventional encoder disc/scale the pattern marks segments are much wider than the track pitch of optical storage disc. Radial wondering of the OPU central beam on the wide dimensions pattern marks segments, within the conventional encoder eccentricity tolerance specifications, do not disturb the central beam four quadrant focus error signal, no larger than the common conventional encoder tracking error is introduced and the tracking actuator degree of freedom is not needed. The index track could be placed also in an inner radius to the AQB (A quad B; the A and B quadrature tracks that maintain ¼ cycle/period phase shift between them) tracks, for example, as it is common in conventional encoder, and not only in between the AQB tracks: one flanking beam will read the outmost radius AQB track, the central beam will read the inner radius AQB track—using the central beam four quadrant sum signal and also will produce the focus error signal—and the other flanking beam will read the Index track. Another alternative is using glass CD/DVD/BR discs as the optical encoder disc if higher thermal stability with temperature shifts is desired. A glass plate of this kind is used in HDD (Hard Disc Drive), which is highly stable against heat. A glass encoder disc plate, on which multiple tracks of DVD-like pit marks, for example, are coded, is an existing process. Formation of pit marks tracks on a glass plate is an existing process, and it's done by plasma cutting machine. Glass CD/DVD discs are made this way today.

Employing production technologies similar, modified or equal to the one being used for optical storage disc manufacturing in the disclosed encoders disc/scale production may be advantageous. It will provide a desired PC (Poly Carbonate) protecting layer for the encoder scale/disc information data layer, which doesn't exist in current scale/disc being used today. This will improve the robustness performance of the encoder in harsh dusty particle dirt environment. Also, if the scale/disc is produced in the same techniques as the optical storage disc is manufactured today then the built in by design OPU objective lens compensation for the optical path within the disc PC layer above is optimal for reading the encoder scale/disc information pattern. The use of the optical storage format and techniques in laying out the encoder quadrature data pattern may provide programmable flexibility for determining any desired encoder disc or scale resolution in cycles per revolution or per unit linear distance, respectively.

The encoder quadrature pattern may be laid out on the disc in a way that provides multiple encoder resolutions on the same scale/disc unit. That is, for example, an encoder disc with multi-resolution encoder zones is achievable by changing the encoder resolution every predetermined number of pitches along the encoder disc spiral pattern. Such a disc may be implemented through the use of software to write the pattern on the disc. Positioning the OPU read head above the flexible desired encoder resolution zone is achieved by applying the appropriate offset voltage to the OPU read head objective lens tracking actuator or possibly moving the whole head towards the desired encoder density zone.

The encoder electronics may use the existing optical storage drive chip set or part of it for processing and interpreting the encoder focusing, tracking and quadrature data, taking advantage of their low price because of their high production volumes for the optical storage market segment.

The various embodiments disclosed herein can be implemented using hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

Software shall be construed broadly to mean any type of instructions, whether referred to as software, firmware, middleware, microcode, hardware description language, or otherwise. Instructions may include code (e.g., in source code format, binary code format, executable code format, or any other suitable format of code).

All examples and conditional language recited herein are intended for pedagogical purposes to aid the reader in understanding the disclosed embodiments contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. An optical encoder, comprising:
    a light focusing element;
    a light detector that receives light from a substrate containing position markings via the light focusing element and converts the received light into at least one electrical signal, wherein the substrate is encoded with information to provide any one of: an incremental position and an absolute position so that the optical encoder is respectively operable as any one of: an incremental encoder and an absolute encoder;
    a servomechanism that adjusts a position of the light focusing element based on the at least one electrical signal;
    a processor receiving the at least one electrical signal and adapted to report motion of the substrate based on the received at least one electrical signal, the motion being indicative of any one of: an incremental position of the substrate and an absolute position of the substrate;
    an optical element that splits light originating at a light source into at least a central beam and two flanking beams, and wherein electrical representations of reflection of the flanking beams from the substrate are used to determine the reported motion.

2. The optical encoder of claim 1, wherein the light focusing element is moveable by the servomechanism laterally with respect to the substrate.

3. The optical encoder of claim 2, further wherein the light focusing element is movable by the servomechanism toward or away from substrate.

4. The optical encoder of claim 1, further wherein the light focusing element is movable by the servomechanism toward or away from substrate.

5. The optical encoder of claim 1, wherein the received light has an origin in a light source that is a laser.

6. The optical encoder of claim 1, wherein the substrate is shaped as a disc.

7. The optical encoder of claim 1, wherein the markings are lands and pits that are arranged in a linear pattern.

8. The optical encoder of claim 1, wherein the actuator adjusts the focus of the light received at the light detector by controlling the position of the light focusing element.

9. The optical encoder of claim 1, further comprising a half mirror plate that reflects light from a light source to the substrate and passes light from the substrate to the light detector.

10. The optical encoder of claim 1, wherein the light focusing element is an objective lens.

11. The optical encoder of claim 1, wherein the encoder accuracy is actively adjusted in response to temperature variations.

12. The optical encoder of claim 1, wherein the substrate is an optical disc substrate.

13. The optical encoder of claim 1, wherein the markings are lands and pits of different lengths.

14. The optical encoder of claim 1, wherein the motion detected is an angular distance traveled by the substrate.

15. The optical encoder of claim 1, wherein the motion detected is a linear distance traveled by the substrate.

16. The optical encoder of claim 1, wherein the encoder accuracy is actively adjusted to compensate for thermal changes of the substrate.

17. The optical encoder of claim 1, wherein the light focusing element is positioned by the servomechanism to compensate for flatness variations of the substrate.

18. The optical encoder of claim 1, wherein the substrate is encoded with information representing a low resolution absolute encoder pattern usable for use in making coarse absolute measurements and information representing a high resolution incremental encoder quadrature pattern for use in making fine measurements.

19. The optical encoder of claim 1, wherein the substrate is encoded with information representing a coarse absolute encoder pattern for use in an initialization procedure and information representing a high resolution incremental encoder quadrature pattern for use in making high resolution position measurements.

20. The optical encoder of claim 1, further comprising: the light source.

21. The optical encoder of claim 1, wherein the position markings are lands and pits that are arranged in a spiral pattern having indexing for each turn of the spiral, the spiral pattern being treated by the processor as a spiral pattern based on which both an encoder angular position per revolution and a number of encoder substrate turns are determinable.

22. The optical encoder of claim 1, further comprising:
a light source; and
an optical element that splits light originating at the light source into the central beam and the two flanking beams;
wherein the light focusing element is an objective lens; and
wherein the central beam and the two flanking beams pass through the objective lens when traveling from the light source towards the substrate and reflections of the central beam and the two flanking beams pass back from the substrate through the objective lens to the light detector.

23. The optical encoder of claim 1, wherein the motion is reported as an angular change.

24. The optical encoder of claim 1, wherein the position markings are lands and pits that are arranged in spiral tracks between which are spiral half-track lands.

25. A method for use in an optical encoder comprising:
a light focusing element;
a light detector that receives light from a substrate containing position markings via the light focusing element and converts the received light into at least one electrical signal, wherein the substrate is encoded with information to provide any one of: an incremental position and an absolute position so that the optical encoder is respectively operable as any one of: an incremental encoder and an absolute encoder;
a servomechanism adapted to adjust a position of the light focusing element based on the at least one electrical signal; and
an optical element that splits light originating at a light source into at least a central beam and two flanking beams;
the method comprising:
responsive to the at least one electrical signal, adjusting the position of the light focusing element; and
providing an electrical indication of motion of the substrate, the motion being determined based on the received at least one electrical signal and electrical representations of reflection of the flanking beams from the substrate, the motion being indicative of any one of: an incremental position of the substrate and an absolute position of the substrate.

26. The method of claim 25, wherein the position of the light focusing element is adjusted so as to control a location of focal point of light passing through the light focusing element.

27. The method of claim 25, wherein the position markings are lands and pits that are arranged in a spiral pattern having indexing for each turn of the spiral, the spiral pattern being treated as a spiral pattern based on which both an encoder angular position per revolution and a number of encoder substrate turns are determinable.

28. The method of claim 25, wherein the, optical encoder further comprises:
a light source; and
an optical element that splits light originating at the light source into the central beam and the two flanking beams;
wherein the light focusing element is an objective lens; and
wherein the central beam and the two flanking beams pass through the objective lens when traveling from the light source towards the substrate and reflections of the central beam and the two flanking beams pass back from the substrate through the objective lens to the light detector.

29. The optical encoder of claim 25, wherein the position markings are lands and pits that are arranged in spiral tracks between which are spiral half-track lands.

* * * * *